(No Model.) 2 Sheets—Sheet 1.

W. R. MAUD.
CORKSCREW.

No. 561,016. Patented May 26, 1896.

Witnesses:
J. B. McGirr.
Archie G. Reese.

Inventor
William Robert Maud
By Leonard Hunter Dyer
Attorney

ANDREW B. GRAHAM. PHOTO-LITHO. WASHINGTON, D.C.

(No Model.)  2 Sheets—Sheet 2.
W. R. MAUD.
CORKSCREW.
No. 561,016.  Patented May 26, 1896.
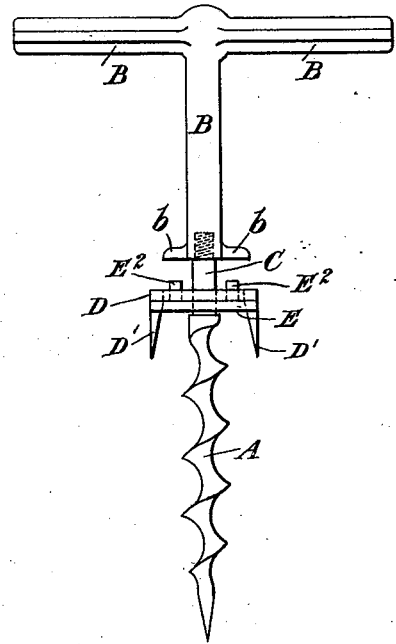
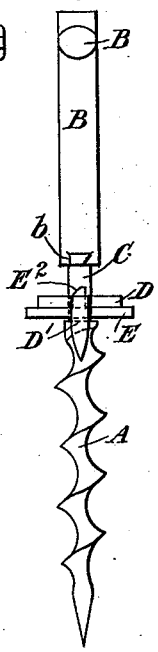
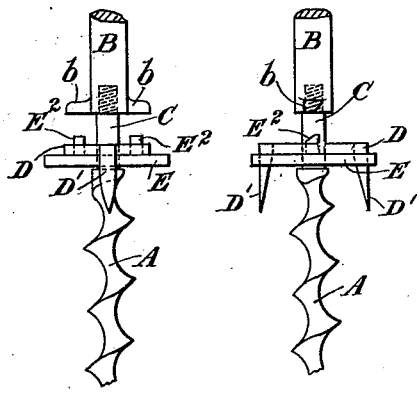
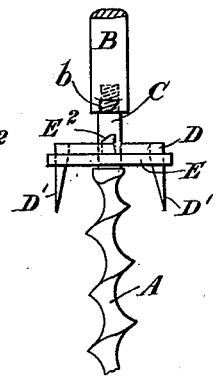
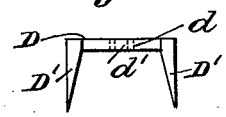
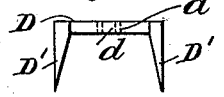
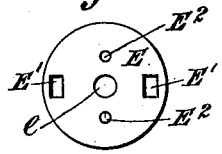
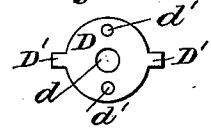
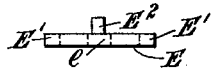
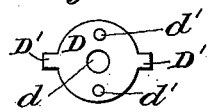
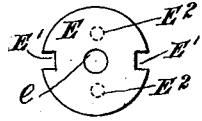
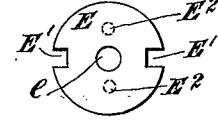
Witnesses:  
J. B. McGinn.  
Archie G. Reese.
Inventor:  
William Robert Maud.  
By Leonard Huntress Dyer,  
Attorney.

UNITED STATES PATENT OFFICE.

WILLIAM ROBERT MAUD, OF PONTEFRACT, ENGLAND.

CORKSCREW.

SPECIFICATION forming part of Letters Patent No. 561,016, dated May 26, 1896.

Application filed July 15, 1895. Serial No. 556,039. (No model.) Patented in England June 28, 1894, No. 12,529, and May 23, 1895, No. 10,211.

*To all whom it may concern:*

Be it known that I, WILLIAM ROBERT MAUD, a subject of the Queen of Great Britain, residing at Pontefract, in the county of York, England, have invented new and useful Improvements in Corkscrews, (for which I have applied for patents in Great Britain, dated June 28, 1894, No. 12,529, and May 23, 1895, No. 10,211,) of which the following is a specification.

This invention relates to improvements in corkscrews; and its object is to enable corks to be drawn from the necks of beer, wine, and other bottles more readily than at present by causing the corks to be simply twisted from their beds or positions in the necks of the bottles with ease and safety, thereby reducing the liability of breakage either of the cork or neck of the bottle to a minimum and at the same time preventing the corkscrew pulling through the cork without drawing it. The above object is attained by combining with, say, an ordinary corkscrew, above its worm or twisted thread, an attachment consisting of a disk or washer capable of being automatically locked and unlocked by any convenient means with the stem or handle of the corkscrew, the said disk or washer being also armed on its under side with any desired number of pendent pins arranged to enter the top of the cork as the twisted thread or worm passes into and through it.

In the accompanying drawings I have shown four ways of carrying the invention into practice; but I wish it to be distinctly understood that the illustrations therein given are to be taken as examples only of simple, ready, and inexpensive methods that might be employed for automatically locking and unlocking the disk or washer with the stem of the corkscrew.

Figure 1:
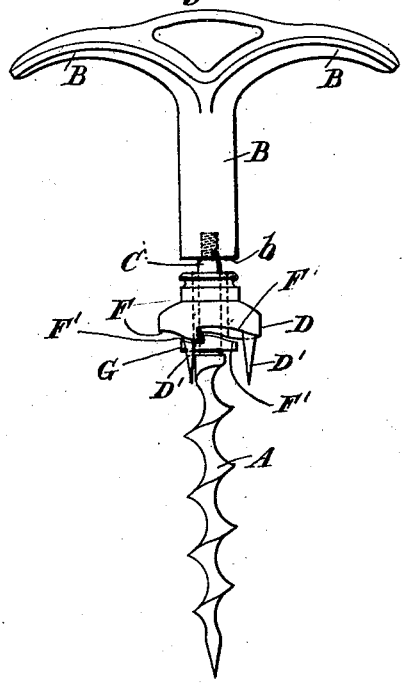
Figure 6:
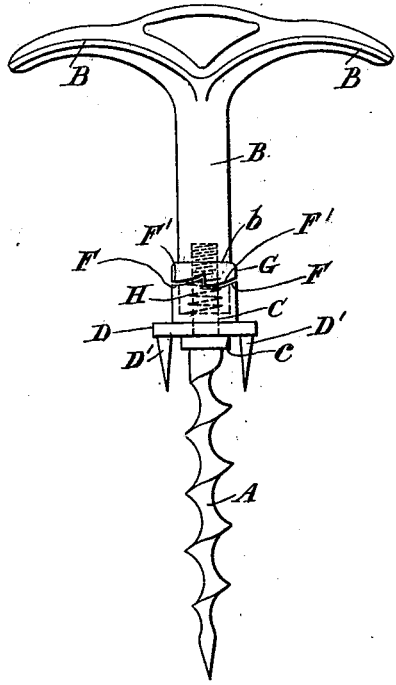
Figure 2:
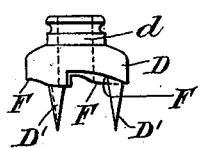
Figure 5:
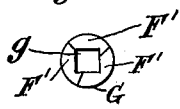
Figure 7:
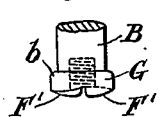
Figure 10:
Figure 3:
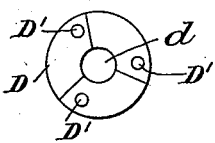
Figure 4:
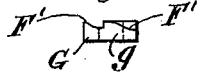
Figure 8:
Figure 9:
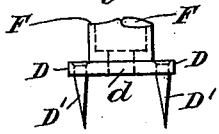

In the drawings, Figure 1 is a front elevation with my invention applied. Figs. 2 and 3 are respectively an elevation and a plan looking at the bottom of the armed disk or washer used at Fig. 1. Figs. 4 and 5 are respectively an elevation and plan of locking-piece used at Fig. 1; Fig. 6, an elevation of corkscrew with locking device arranged above the armed disk. Figs. 7 and 8 are respectively an elevation and a plan of locking-piece used at Fig. 6. Figs. 9 and 10 are respectively an elevation and a plan looking on the under side of armed disk or washer used at Fig. 6. Figs. 11 and 12 are front and end elevations of corkscrew with locking device consisting of pins and projections. Figs. 13 and 14 are respectively an elevation and a plan of armed washer used at Figs. 11 and 12. Figs. 15 and 16 are respectively an elevation and plan of locking device for use at Figs. 11 and 12; Fig. 17, a plan of locking device for use at Fig. 19. Figs. 18 and 19 are respectively part end and front elevations of corkscrew with my invention applied. Figs. 20 and 21 are respectively an elevation and a plan of armed washer used at Figs. 18 and 19. Figs. 22 and 23 are respectively an elevation and a plan of locking device used at Figs. 18 and 19.

A is a twisted metal thread or worm (hereinafter termed the "worm") provided with a pointed or other suitable end for entering the cork.

B is the handle or top of the corkscrew, which may or may not be armed at its lower end with any desired number of inclined or other projecting pieces $b$. Two are shown in the drawings and are hereinafter termed "locking-pieces." The handle B may be of any convenient or suitable shape or configuration and may be made of metal or other suitable material, and it is employed for turning or forcing the worm into the cork. The above-described two parts, with the exception of the locking-pieces, may be of ordinary construction and connected or fixed together in the ordinary or any convenient way—such as, for instance, by screwing them together.

Above the worm A and below the locking-pieces is a shank C, which may be either square or round or of any other convenient and suitable shape or length. The shank C may be formed by either slightly reducing the upper end of the worm A, as shown, say, at Fig. 1, or by forming on or fixing thereto by any suitable means a collar, as shown, say, at Fig. 6. On the shank C are mounted and arranged to slide freely any desired number of disks or other suitably-shaped washers. Two are shown in the drawings, (marked D and E,) each of which are respectively provided with a central hole $d$ and $e$ of the same contour as the shank C. The washer D is provided with two or more holes $d'$. The washer D is also armed on its edge, as shown, or on its under side with any desired number of downwardly-projecting pins or pegs $D'$ for entering the cork, and they may be arranged, if desired, to pass through the guide holes or recesses $E'$, provided in the washer E, as shown, say, at Figs. 11, 12, 18, and 19. The washer E is also armed on its upper surface with a number of pins $E^2$, corresponding in number with the holes $d'$, through which they pass. The pins $E^2$ may be slightly inclined and in addition to forming guides also act as teeth over which the locking-pieces ride, and when the pins $D'$ have been forced entirely into the cork act as stops for meshing with the locking-pieces $b$, Figs. 11, 12, 18, and 19, or F, Figs. 1 and 6, whereby the handle and other parts of the corkscrew are automatically locked together for enabling the cork to be twisted from its bed or position in the neck of the bottle for withdrawal purposes. It will readily be understood that the parts D and E, which are made of metal or other convenient material, may be cheaply manufactured—as, for instance, by stamping—and thereby add very little to the cost of the corkscrew, while greatly increasing its efficiency.

To withdraw a cork from the neck of a bottle, the pointed end of the worm A is placed in or about the center of the cork and pressed therein until it forms a nut for the screw-thread of the worm, which will, as soon as the points of the pins $D'$ touch the top of the cork, cause the washer D first to rise; but when the cork comes in contact with the washer E this also is pressed upward or rises and causes the pins on its upper surface to come into contact with the locking-pieces $b$. When by the continued turning or rotation of the handle B and worm A the pins $D'$ have been forced or driven home into the cork until the top of the cork is in contact with the under side of the washer E, the pins $E^2$ and locking-pieces $b$ thus become automatically meshed or locked together. By then continuing to turn or rotate the handle B, and at the same time slightly raising it, the cork may be turned in the neck of the bottle and readily withdrawn therefrom.

On the under side of the disk or washer D, as shown at Fig. 1, or on its top or upper surface, as shown at Fig. 6, is cut or otherwise formed any desired number—say, for example, two, three, or more—of inclines or projections to form teeth F, each of which may be somewhat similar to a ratchet-tooth, and which in the example given at Fig. 1 engage with a second and smaller washer G, having also on its upper surface a corresponding number of inclines or teeth $F'$, arranged to mesh with the teeth F on the disk or washer D, thereby forming a simple and convenient arrangement of clutch. The washer G is provided with a square hole $g$ to fit and slide upon the shank C. I would have it understood that if desired the washer G may be arranged to form part of or be fixed to the shank C.

At Fig. 6, where the teeth F are formed on the upper portion of the boss of the disk or washer D, the locking-piece is shown in the form of a washer G to project slightly beyond and to form part of the base of the handle B, or it may be attached thereto by any convenient means. The disk or washer D (shown at Fig. 6) is also shown provided with a recess, in which may, when preferred, be inserted the spiral spring H, which is employed for aiding in raising from or causing the teeth $F'$ on the under side of the washer to ride more readily over the teeth or inclines F before the two sets of teeth are locked together, as well as for pressing the pins $D'$ into the cork. The disk or washer D revolves with the corkscrew until its worm A has sufficiently entered the cork and until the pins $D'$ have come in contact with its top, when by the continued rotation of the handle B the worm A causes the pins $D'$ to be forced or driven completely into the cork by base of the handle coming in contact with the top of the boss of the disk or washer D by the action of the teeth F and $F'$ passing over each other until they become automatically locked or meshed together, when, by continuing to turn or rotate the corkscrew, the cork will be readily carried around with the pins $D'$ and withdrawn from the neck of the bottle by a slight upward movement being imparted to the corkscrew at the same time that it is rotated.

At Fig. 1 the cork forces the teeth $F'$ into contact with teeth F by raising the washer G on the shank C; but at Fig. 6 a similar effect is obtained by the worm A drawing the teeth $F'$ down to and in contact with the teeth F on the top of the boss of the disk or washer D.

I would have it understood that any other mechanical and equivalent locking device— such as, for instance, a clutch or a single disk or washer armed on its edge or under side with pendent pins, such as $D'$, and on its upper surface with projecting inclines or teeth, such as $E^2$—may be employed in place of the herein-described arrangement.

Having now fully described the nature of my invention, what I claim, and desire to secure by Letters Patent, is—

1. In a corkscrew, the combination with the worm A, the handle B, the locking-piece $b$, on the said handle, the stem C, the disks or washers D and E mounted and sliding on the stem C, one of said disks being provided on its edge or lower face with downwardly-projecting pins $D'$, and the other disk armed on its upper face with pins $E^2$ arranged so as to automatically lock with the locking-pieces $b$, whenever the pins $D'$ are driven into the cork, substantially as set forth.

2. The combination in a corkscrew such as herein described, of a worm mounted in a handle having locking-pieces secured thereto disks or washers, sliding on a stem between the top of the said worm and the base of the said handle, one of said disks or washers being armed on its edge or under side with pendent pins, and the other washer or disk provided on its upper face with pins arranged to pass through the first-named disk or washer and to automatically lock or mesh with the locking-pieces on the handle of the corkscrew whenever the pendent pins are driven home into the cork as set forth.

3. In a corkscrew, the combination with the worm, the handle, the locking-piece on the said handle, the stem, the disk or washer mounted and sliding on the stem, said disk being provided on its edge or lower face with downwardly-projecting pins, and armed on its upper face with pins or projections arranged so as to automatically lock with the locking-pieces whenever the pins are driven into the cork, substantially as set forth.

In testimony whereof I have hereunto signed my name to this specification in presence of two subscribing witnesses.

WILLIAM ROBERT MAUD.

Witnesses:
W. JAMES COUSINS,
W. FAIRBURN-HART.